US012811040B2

(12) United States Patent
Hong et al.

(10) Patent No.: US 12,811,040 B2
(45) Date of Patent: Nov. 24, 2026

(54) NON-ORIENTED ELECTRICAL STEEL SHEET, AND METHOD FOR MANUFACTURING SAME

(71) Applicant: POSCO Co., Ltd, Pohang-si (KR)

(72) Inventors: Jaewan Hong, Pohang-si (KR); Junesoo Park, Pohang-si (KR); Yongsoo Kim, Pohang-si (KR); Suyong Shin, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 530 days.

(21) Appl. No.: 18/268,841

(22) PCT Filed: Dec. 15, 2021

(86) PCT No.: PCT/KR2021/019115

§ 371 (c)(1),
(2) Date: Jul. 18, 2023

(87) PCT Pub. No.: WO2022/139314

PCT Pub. Date: Jun. 30, 2022

(65) Prior Publication Data

US 2024/0038423 A1 Feb. 1, 2024

(30) Foreign Application Priority Data

Dec. 21, 2020 (KR) ........................ 10-2020-0179362

(51) Int. Cl.

| | |
|---|---|
| ***H01F 1/147*** | (2006.01) |
| ***C21D 6/00*** | (2006.01) |
| ***C21D 8/12*** | (2026.01) |
| ***C21D 8/1216*** | (2026.01) |
| ***C21D 8/1244*** | (2026.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/14*** | (2006.01) |
| ***C22C 38/60*** | (2006.01) |

(52) U.S. Cl.

CPC ......... *H01F 1/14766* (2013.01); *C21D 6/005* (2013.01); *C21D 6/008* (2013.01); *C21D 8/1222* (2013.01); *C21D 8/1233* (2013.01); *C21D 8/1261* (2013.01); *C21D 8/1272* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/14* (2013.01); *C22C 38/60* (2013.01); *C22C 2202/02* (2013.01)

(58) Field of Classification Search

None

See application file for complete search history.

(56) References Cited

U.S. PATENT DOCUMENTS

| | | | | |
|---|---|---|---|---|
| 6,139,650 A * | 10/2000 | Oda | ........................ | C22C 38/02 148/306 |
| 2017/0260600 A1 | 9/2017 | Okubo et al. | | |
| 2021/0062281 A1 | 3/2021 | Lee et al. | | |

FOREIGN PATENT DOCUMENTS

| | | | |
|---|---|---|---|
| CN | 110114489 | A | 8/2019 |
| EP | 0866144 | A1 | 9/1998 |
| JP | H05-125495 | A | 5/1993 |
| JP | 2002-371340 | A | 12/2002 |
| JP | 2007039721 | A * | 2/2007 |
| JP | 2008-174773 | A | 7/2008 |
| JP | 2009-299102 | A | 12/2009 |
| JP | 2010-121150 | A | 6/2010 |
| JP | 4586669 | B2 * | 11/2010 |
| JP | 2011-084761 | A | 4/2011 |
| JP | 4779474 | B2 | 9/2011 |
| JP | 2017-088968 | A | 5/2017 |
| JP | 2020-504787 | A | 2/2020 |
| JP | 2020-100860 | A | 7/2020 |
| KR | 10-2017-0020481 | A | 2/2017 |
| KR | 10-2018-0070949 | A | 6/2018 |
| KR | 10-2019-0077891 | A1 | 7/2019 |
| KR | 10-2019-0137127 | A | 12/2019 |
| KR | 10-2020-0020013 | A | 2/2020 |
| KR | 10-2020-0035759 | A | 4/2020 |
| KR | 10-2021-0079491 | A | 6/2021 |
| WO | 2016/017263 | A1 | 2/2016 |

(Continued)

OTHER PUBLICATIONS

International Search Report dated Apr. 27, 2022 issued in International Patent Application No. PCT/KR2021/019115 (with English translation).
Office Action dated Oct. 1, 2024, issued in corresponding Japanese Patent Application No. 2023-537565.
Extended European Search Report dated Jul. 8, 2025 issued in the corresponding European Patent Application No. 21911381.8. (Note: JP 2017-088968 A already submitted.).
Indian Office Action dated Aug. 22, 2024 issued in Indian Patent Application No. 202337047177 (English translation).
Office Action dated Apr. 27, 2025, issued in corresponding Chinese Patent Application No. 202180094307.0.
Search Report dated Apr. 27, 2025, issued in corresponding Chinese Patent Application No. 202180094307.0.

(Continued)

*Primary Examiner* — Jenny R Wu

(74) *Attorney, Agent, or Firm* — Morgan Lewis & Bockius LLP

(57) ABSTRACT

The present invention may provide a non-oriented electrical steel sheet containing, by wt %, 2.10 to 3.80% of Si, 0.001 to 0.600% of Mn, 0.001 to 0.600% of Al, 0.001 to 0.100% of P, 0.0005 to 0.0100% of C, 0.001 to 0.010% of S, 0.0001 to 0.010% of N, 0.0005 to 0.0050% of Ti, 0.001 to 0.080% of Sn, 0.001 to 0.080% of Sb, 0.0005 to 0.0030% of Se, 0.0003 to 0.0010% of Ge, and a balance of Fe and inevitable impurities, the non-oriented electrical steel sheet having excellent iron loss and magnetic flux density and low strength.

12 Claims, No Drawings

(56) References Cited

FOREIGN PATENT DOCUMENTS

| | | | |
|---|---|---|---|
| WO | 2019-132129 | A1 | 7/2019 |
| WO | 2020/188783 | A1 | 9/2020 |

* cited by examiner

NON-ORIENTED ELECTRICAL STEEL SHEET, AND METHOD FOR MANUFACTURING SAME

CROSS-REFERENCE OF RELATED APPLICATIONS

This application is the U.S. National Phase under 35 U.S.C. § 371 of International Patent Application No. PCT/KR2021/019115, filed on Dec. 15, 2021, which in turn claims the benefit of Korean Application No. 10-2020-0179362, filed on Dec. 21, 2020, the disclosures of which applications are incorporated by reference herein.

TECHNICAL FIELD

An exemplary embodiment of the present invention relates to a non-oriented electrical steel sheet and a method for manufacturing the same. More particularly, an exemplary embodiment of the present invention relates to a non-oriented electrical steel sheet that has excellent magnetic flux density and iron loss and low strength because a texture is improved by controlling alloy components to selectively form and control precipitates to minimize an influence of the precipitates, and a method for manufacturing the same.

BACKGROUND ART

An electrical steel sheet is a product used as a material for a transformer, a motor, and an electric machine, and unlike a general carbon steel that places importance on processability such as mechanical properties, the electrical steel sheet is a functional product that places importance on electrical properties. Required electrical properties include low iron loss, high magnetic flux density, high magnetic permeability, and a high stacking factor.

The electrical steel sheet is classified into a grain-oriented electrical steel sheet and a non-oriented electrical steel sheet. The grain-oriented electrical steel sheet is an electrical steel sheet having excellent magnetic properties in a rolling direction by forming a Goss texture ({110}<001> texture) on the entire steel sheet by using an abnormal grain growth phenomenon called secondary recrystallization. The non-oriented electrical steel sheet is an electrical steel sheet of which magnetic properties are uniform in all directions on a rolled sheet.

In a production process of the non-oriented electrical steel sheet, a slab is manufactured, and then the slab is subjected to hot rolling, cold rolling, and final annealing to form an insulating coating layer.

In a production process of the grain-oriented electrical steel sheet, a slab is manufactured, and then the slab is subjected to hot rolling, preliminary annealing, cold rolling, decarburization annealing, and final annealing to form an insulating coating layer.

Among them, the non-oriented electrical steel sheet is generally used as a material for a motor core, an iron core of a generator, an electric motor, and a small transformer because it has uniform magnetic properties in all directions. Typical magnetic properties of the non-oriented electrical steel sheet are iron loss and magnetic flux density, as the iron loss of the non-oriented electrical steel sheet decreases, the iron loss lost in a process of magnetizing an iron core decreases, resulting in improvement of efficiency, and since as the magnetic flux density increases, a larger magnetic field may be induced with the same energy, and a less current may be applied to obtain the same magnetic flux density, copper loss is reduced, such that energy efficiency may be improved.

A typically used method for increasing the magnetic properties of the non-oriented electrical steel sheet is to add an alloying element such as Si. Resistivity of steel may be increased by the addition of the alloying element, and as the resistivity increases, eddy current loss decreases, such that the total iron loss may be reduced. On the other hand, as the amount of Si added increases, the magnetic flux density is deteriorated and brittleness increases, and when more than a predetermined amount of Si is added, cold rolling is impossible, which makes commercial production impossible. In particular, the electrical steel sheet may obtain the effect of reducing the iron loss as it becomes thinner, but the deterioration of rollability due to brittleness causes a serious problem. The maximum content of Si that may implement commercial production is known to be approximately 3.5 to 4.0%, and it is possible to produce the finest non-oriented electrical steel sheet having excellent magnetism by adding elements such as Al and Mn in order to further increase the resistivity of steel. However, in actual use of the motor, both iron loss and magnetic flux density are required depending on the purpose thereof, and therefore, a non-oriented electrical steel sheet having high resistivity, low iron loss, and high magnetic flux density is required.

In a manufacturing process of a motor core, an iron core of a generator, an electric motor, a small transformer, and the like using the non-oriented electrical steel sheet, processing processes such as punching is performed. A typical high-efficiency non-oriented electrical steel sheet has high hardness because it has a high content of resistivity elements such as Si and Al. This property causes damage to a mold required for punching, and leads to an increase in processing cost of the electrical steel sheet.

DISCLOSURE

Technical Problem

An exemplary embodiment of the present invention provides a non-oriented electrical steel sheet and a method for manufacturing the same. More particularly, an exemplary embodiment of the present invention provides a non-oriented electrical steel sheet that has excellent magnetic flux density and iron loss and low strength because a texture is improved by adding Se and Ge to selectively form and control precipitates, and a method for manufacturing the same.

Technical Solution

An exemplary embodiment of the present invention provides a non-oriented electrical steel sheet containing, by wt %: 2.10 to 3.80% of Si, 0.001 to 0.600% of Mn, 0.001 to 0.600% of Al, 0.0005 to 0.0030% of Se, 0.0003 to 0.0010% of Ge, and a balance of Fe and inevitable impurities.

The non-oriented electrical steel sheet may further contain, by wt %, 0.001 to 0.100% of P, 0.0005 to 0.0100% of C, 0.001 to 0.010% of S, 0.0001 to 0.010% of N, 0.0005 to 0.0050% of Ti, 0.001 to 0.080% of Sn, and 0.001 to 0.080% of Sb.

The non-oriented electrical steel sheet may further contain 0.07 wt % or less of one or more of Cu, Ni, and Cr, respectively.

The non-oriented electrical steel sheet may further contain 0.01 wt % or less of one or more of Zr, Mo, and V, respectively.

When an electron backscatter diffraction (EBSD) test is performed on a ½ to ⅓ region of a thickness of the non-oriented electrical steel sheet, an intensity of a {111} plane facing a <112> direction based on a rolling direction on an orientation distribution function (ODF) image may be 2.5 or less compared to a random orientation.

A ratio of {tensile strength (MPa)–yield strength (MPa)} to an average grain diameter (μm) of the non-oriented electrical steel sheet may be 1.10 to 1.40.

An average grain diameter of the non-oriented electrical steel sheet may be 80 to 130 μm.

A yield strength of the non-oriented electrical steel sheet may be 350 to 400 MPa.

A tensile strength of the non-oriented electrical steel sheet may be 490 to 550 MPa.

Another exemplary embodiment of the present invention provides a method for manufacturing a non-oriented electrical steel sheet, the method including: heating a slab containing, by Mc/0, 2.10 to 3.80% of Si, 0.001 to 0.600% of Mn, 0.001 to 0.600% of Al, 0.0005 to 0.0030% of Se, 0.0003 to 0.0010% of Ge, and a balance of Fe and inevitable impurities; manufacturing a hot-rolled sheet by hot rolling the slab; manufacturing a cold-rolled sheet by cold rolling the hot-rolled sheet; and subjecting the cold-rolled sheet to final annealing.

The slab may further contain, by wt %, 0.001 to 0.100% of P, 0.0005 to 0.0100% of C, 0.001 to 0.010% of S, 0.0001 to 0.010% of N, 0.0005 to 0.0050% of Ti, 0.001 to 0.080% of Sn, and 0.001 to 0.080% of Sb.

The method for manufacturing a non-oriented electrical steel sheet may further include, after the manufacturing of the hot-rolled sheet, annealing the hot-rolled sheet at a temperature of 900 to 1,195° C. for 40 to 100 seconds.

The subjecting of the cold-rolled sheet to the final annealing may be performed at a temperature of 850 to 1,080° C. for 60 to 150 seconds.

Advantageous Effects

According to an exemplary embodiment of the present invention, it is possible to provide a non-oriented electrical steel sheet that has excellent iron loss and magnetic flux density and low strength because a texture is improved.

MODE FOR INVENTION

The terms "first", "second", "third", and the like are used to describe various parts, components, regions, layers, and/or sections, but are not limited thereto. These terms are only used to differentiate a specific part, component, region, layer, or section from another part, component, region, layer, or section. Accordingly, a first part, component, region, layer, or section which will be described hereinafter may be referred to as a second part, component, region, layer, or section without departing from the scope of the present invention.

Terminologies used herein are to mention only a specific exemplary embodiment, and are not to limit the present invention. Singular forms used herein include plural forms as long as phrases do not clearly indicate an opposite meaning. The term "comprising" used in the specification concretely indicates specific properties, regions, integers, steps, operations, elements, and/or components, and is not to exclude the presence or addition of other specific properties, regions, integers, steps, operations, elements, and/or components.

When any part is positioned "on" or "above" another part, it means that the part may be directly on or above the other part or another part may be interposed therebetween. In contrast, when any part is positioned "directly on" another part, it means that there is no part interposed therebetween.

In addition, unless otherwise stated, % means wt %, and 1 ppm is 0.0001 wt %.

In an exemplary embodiment of the present invention, the meaning of "further containing an additional element" means that the additional element is substituted for a balance of iron (Fe) by the amount of additional element added.

Unless defined otherwise, all terms including technical terms and scientific terms used herein have the same meanings as understood by those skilled in the art to which the present invention pertains. Terms defined in a generally used dictionary are additionally interpreted as having the meanings matched to the related technical document and the currently disclosed contents, and are not interpreted as ideal or very formal meanings unless otherwise defined.

Hereinafter, exemplary embodiments of the present invention will be described in detail so that those skilled in the art to which the present invention pertains may easily practice the present invention. However, the present invention may be implemented in various different forms and is not limited to exemplary embodiments described herein.

Resistivity elements such as Si, Al, and Mn added to reduce iron loss of a non-oriented electrical steel sheet may reduce a saturation magnetic flux density of a material. In addition, as these elements are added, the strength of the steel sheet increases, and as a result, there has been a problem of shortening a lifespan of a mold during punching.

Therefore, it is required to improve a texture of the non-oriented electrical steel sheet so that the non-oriented electrical steel sheet may have low strength while reducing iron loss and increasing magnetic flux density, but it is difficult to implement the improvement of the texture in a common steel production process, and therefore, the present invention is intended to solve this problem.

Hereinafter, each step will be described in detail.

A non-oriented electrical steel sheet according to an exemplary embodiment of the present invention contains, by wt %, 2.10 to 3.80% of Si, 0.001 to 0.600% of Mn, 0.001 to 0.600% of Al, 0.001 to 0.100% of P, 0.0005 to 0.0100% of C, 0.001 to 0.010% of S, 0.0001 to 0.010% of N, 0.0005 to 0.0050% of Ti, 0.001 to 0.080% of Sn, 0.001 to 0.080% of Sb, 0.0005 to 0.0030% of Se, 0.0003 to 0.0010% of Ge, and a balance of Fe and inevitable impurities.

Hereinafter, the reason for limiting the components of the non-oriented electrical steel sheet will be described.

Si: 2.10 to 3.80 wt %

Silicon (Si) is a main element added to reduce eddy current loss of iron loss by increasing resistivity of steel. When the amount of Si added is too small, iron loss is deteriorated. Therefore, it is advantageous to increase the content of Si in terms of iron loss, but when the amount of Si added is too large, price competitiveness may be reduced, the magnetic flux density may be greatly reduced, and problems in processability may occur. Therefore, Si may be contained within the range described above. More specifically, Si may be contained in an amount of 2.10 to 3.80 wt %. Still more specifically, Si may be contained in an amount of 2.50 to 3.20 wt %.

Mn: 0.001 to 0.600 wt %

Manganese (Mn) is an element that reduces the iron loss by increasing the resistivity along with Si, Al, and the like, forms sulfides, and improves the texture. When the amount of Mn added is too small, fine sulfides are precipitated, which may cause deterioration of magnetism. On the other hand, when the amount of Mn added is too large, formation of a {111} texture that is unfavorable for magnetism is promoted, and thus, the magnetic flux density may be reduced. Therefore, Mn may be contained within the range described above. More specifically, Mn may be contained in an amount of 0.005 to 0.600 wt % or 0.050 to 0.350 wt %.

Al: 0.001 to 0.600 wt %

Aluminum (Al) plays an important role in reducing the iron loss by increasing the resistivity along with Si, and also improves rollability or improves workability during cold rolling. When the amount of Al added is too small, there is no effect of reducing high-frequency iron loss, and a precipitation temperature of AlN is lowered to form fine nitrides, which may cause deterioration of magnetism. On the other hand, when the amount of Al added is too large, nitrides are excessively formed, which may cause deterioration of magnetism, and problems in all processes such as steelmaking and continuous casting occur, which may cause a significant deterioration of productivity. Therefore, Al may be contained within the range described above. More specifically, Al may be contained in an amount of 0.005 to 0.600 wt %. Still more specifically, Al may be contained in an amount of 0.070 to 0.450 wt %.

Se: 0.0005 to 0.0030 wt %

Selenium (Se) is a segregation element, segregates on a grain boundary to reduce strength of the grain boundary, and suppresses a phenomenon in which a potential is fixed to the grain boundary. Through this, Se may contribute to controlling precipitates by reducing the conditions that may form precipitates. When the amount of Se added is too small, it is difficult to expect the role described above. When Se is excessively contained, magnetism may be rather deteriorated. Therefore, Se may be contained within the range described above. More specifically, Se may be contained in an amount of 0.0005 to 0.0020 wt %.

Ge: 0.0003 to 0.0010 wt %

Germanium (Ge), like Se, also contributes to controlling precipitates by influencing a behavior of S, C, and N-based precipitates even when added in an extremely small amount as a segregation element. When the amount of Ge added is too small, it is difficult to expect the role described above. When Ge is excessively contained, magnetism may be rather deteriorated. Therefore, Ge may be contained within the range described above. Specifically, Ge may be contained in an amount of 0.0003 to 0.0010 wt %.

P: 0.001 to 0.100 wt %

Phosphorous (P) not only serves to increase the resistivity of the material, but also segregates on the grain boundary to improve a texture so as to increase resistivity and reduce iron loss, and therefore, P may be additionally added. However, when the amount of P added is too large, as a texture that is unfavorable for magnetism is formed, there is no texture improvement effect, and P excessively segregates on the grain boundary, such that the rollability and processability are deteriorated, making production difficult. Therefore, P may be added within the range described above. More specifically, P may be contained in an amount of 0.001 to 0.080 wt %. Still more specifically, P may be contained in an amount of 0.010 to 0.080 wt %.

Sn: 0.001 to 0.080 wt %

Tin (Sn) segregates on the grain boundary and surface to improve the texture of the material and suppresses surface oxidation, and therefore, Sn may be additionally added to improve magnetism. When the amount of Sn added is too large, as the grain boundary segregation becomes severe, surface quality is deteriorated, hardness increases, and the cold-rolled sheet is broken, which may cause deterioration of the rollability. Therefore, Sn may be added within the range described above.

Sb: 0.001 to 0.080 wt %

Antimony (Sb) segregates on the grain boundary and surface to improve the texture of the material and suppresses surface oxidation, and therefore, Sb may be additionally added to improve magnetism. When the amount of Sb added is too large, as the grain boundary segregation becomes severe, the surface quality is deteriorated, the hardness increases, and the cold-rolled sheet is broken, which may cause deterioration of the rollability. Therefore, Sb may be added within the range described above. However, when the amount of Sb added is too small, the texture improvement and surface oxidation inhibiting effects may not be expected.

C: 0.0005 to 0.0100 wt %

Carbon (C) combines with Ti, Nb, and the like to form carbides, resulting in deterioration of magnetism, and may cause a decrease in efficiency of electrical equipment due to an increase in iron loss caused by magnetic aging when used after processing from a final product to an electrical product. More specifically, C may be further contained in an amount of 0.0010 to 0.0030 wt %.

S: 0.001 to 0.010 wt %

Sulfur (S) forms fine sulfides inside a base material to suppress grain growth and weaken iron loss, and therefore, S is preferably added as little as possible. When the amount of S added is large, S may combine with Mn and the like to form precipitates or may cause high-temperature brittleness during hot rolling. Therefore, S may be further contained in an amount of 0.0100 wt % or less. Specifically, S may be further contained in an amount of 0.001 to 0.005 wt %.

N: 0.0001 to 0.010 wt %

Nitrogen (N) not only combines with Al, Ti, and the like to form fine and long precipitates inside the base material, but also combines with other impurities to form fine nitrides, which inhibits the grain growth, resulting in deterioration of iron loss. Therefore, a small amount of N is preferably contained. In an exemplary embodiment of the present invention, N may be further contained in an amount of 0.010 wt % or less. More specifically, N may be further contained in an amount of 0.0001 to 0.10 wt %. Still more specifically, N may be further contained in an amount of 0.0005 to 0.002 wt %.

Ti: 0.0005 to 0.0050 wt %

Titanium (Ti) is an element that has a significantly strong tendency to form precipitates in steel, and forms fine carbides or nitrides inside the base material to inhibit the grain growth, and therefore, as more Ti is added, more carbides and nitrides are formed, which causes deterioration of magnetism such as deterioration of iron. In an exemplary embodiment of the present invention, Ti may be further contained in an amount of 0.0050 wt % or less. More specifically, Ti may be further contained in an amount of 0.0005 to 0.0030 wt %.

The non-oriented electrical steel sheet according to an exemplary embodiment of the present invention may further contain 0.07 wt % or less of one or more of Cu, Ni, and Cr, respectively. In addition, the non-oriented electrical steel sheet may additionally contain As, and in this case, a content of As may be 0.0002 to 0.001%.

Copper (Cu), nickel (Ni), and chromium (Cr), which are elements inevitably added in the steelmaking process, react with impurity elements to form fine sulfides, carbides, and nitrides to adversely affect magnetism, and thus, a content of each of these elements is limited to 0.07 wt % or less.

The non-oriented electrical steel sheet according to an exemplary embodiment of the present invention may further contain 0.01 wt % or less of one or more of Zr, Mo, and V, respectively.

Since zirconium (Zr), molybdenum (Mo), vanadium (V), and the like are strong carbonitride-forming elements, it is preferable to not be added as much as possible, and each of these elements should be contained in an amount of 0.01 wt % or less.

Cu, Ni, and Cr, which are elements inevitably added in the steelmaking process, react with impurity elements to form fine sulfides, carbides, and nitrides to adversely affect magnetism, and thus, a content of each of these elements is limited to 0.07 wt % or less. In addition, since Zr, Mo, V, and the like are also strong carbonitride-forming elements, it is preferable to not be added as much as possible, and each of these elements should be contained in an amount of 0.01 wt % or less.

The balance contains Fe and inevitable impurities. The inevitable impurities are impurities to be incorporated in the steelmaking process and the manufacturing process of the grain-oriented electrical steel sheet and are well known in the art, and thus, a specific description thereof will be omitted. In an exemplary embodiment of the present invention, the addition of elements other than the alloy components described above is not excluded, and various elements may be contained within a range in which the technical spirit of the present invention is not impaired. In a case where additional elements are further contained, these additional elements are contained by replacing the balance of Fe.

As described above, the amounts of Si, Mn, Al, Se, and Ge added are appropriately controlled, such that precipitates may be selectively formed and controlled to improve the texture.

Specifically, an electron backscatter diffraction (EBSD) test is performed on a ½ to ⅓ region of a thickness of the steel sheet, an intensity of {111}<112> on an orientation distribution function (ODF) image may be 2.5 or less compared to a random orientation. The magnetization of the non-oriented electrical steel sheet is most advantageous when a direction of a grain plane is <100> based on a magnetization direction, and is advantageous in an order of <110> and <111>. Therefore, when a ratio of {111}<112>, which is an orientation that is unfavorable for the magnetization, is reduced, an orientation of grains configuring the steel sheet is configured in a direction that is favorable for the magnetization, thereby improving the magnetism. More specifically, the intensity of {111}<112> on the ODF image may be 1.0 to 2.5 compared to the random orientation. The intensity of {111}<112> on the ODF image may be 1.5 to 2.2 compared to the random orientation.

An average grain diameter of the non-oriented electrical steel sheet may be 80 to 130 μm. Specifically, the average grain diameter may be 90 to 125 μm or 100 to 125 μm.

A yield strength of the non-oriented electrical steel sheet may be 350 to 400 MPa. Specifically, the yield strength may be 350 to 380 MPa.

A tensile strength of the non-oriented electrical steel sheet may be 490 to 550 MPa. Specifically, the yield strength may be 500 to 510 MPa.

In addition, a ratio of {tensile strength (MPa)−yield strength (MPa)} to an average grain diameter (μm) may be 1.10 to 1.40. When the average grain diameter decreases, the strength increases, but the magnetism may be deteriorated. The present invention is intended to reduce deterioration of iron loss and to lower strength so as to improve processability. Therefore, it is required to control the average grain diameter in relation to the strength. More specifically, the ratio may be 1.10 to 1.39 or 1.10 to 1.30.

As described above, the amounts of Si, Mn, Al, Se, and Ge added are appropriately controlled, such that precipitates may be selectively formed and controlled to improve the texture, thereby improving the magnetism.

Specifically, an iron loss ($W_{15/50}$) of the non-oriented electrical steel sheet may be 2.20 W/kg or less, and specifically, may be 2.10 W/kg or less. The iron loss ($W_{15/50}$) may be iron loss when a magnetic flux density of 1.5 T is induced at a frequency of 50 Hz. More specifically, the iron loss ($W_{15/50}$) of the electrical steel sheet may be 2.00 W/kg or less. Still more specifically, the iron loss ($W_{15/50}$) of the electrical steel sheet may be 1.80 to 1.95 W/kg. In this case, the magnetism may be measured based on a steel sheet having a thickness of 0.27 to 0.35 mm.

A method for manufacturing a non-oriented electrical steel sheet according to an exemplary embodiment of the present invention includes: manufacturing a hot-rolled sheet by hot rolling a slab; manufacturing a cold-rolled sheet by cold rolling the hot-rolled sheet; and subjecting the cold-rolled sheet to final annealing.

Since alloy components of the slab are described in the alloy components of the non-oriented electrical steel sheet described above, repeated descriptions will be omitted. The alloy components are not substantially changed in the manufacturing process of the non-oriented electrical steel sheet, and thus, the alloy components of the non-oriented electrical steel sheet and the slab are substantially the same.

Specifically, the slab may contain, by wt %, 2.10 to 3.80% of Si, 0.001 to of Mn, 0.001 to 0.600% of Al, 0.001 to 0.100% of P, 0.0005 to 0.0100% of C, 0.001 to 0.010% of S, 0.0001 to 0.010% of N, 0.0005 to 0.0050% of Ti, 0.001 to 0.080% of Sn, 0.001 to 0.080% of Sb, 0.0005 to 0.0030% of Se, 0.0003 to 0.0010% of Ge, and a balance of Fe and inevitable impurities.

Since the other additional elements are described in the alloy components of the non-oriented electrical steel sheet, repeated descriptions will be omitted.

Before the slab is hot rolled, the slab may be heated. A slab heating temperature is not limited, and the slab may be heated at a temperature range of 1,150 to 1,250° C. for 0.1 to 1 hour. When the slab heating temperature is too high, precipitates such as AlN and MnS present in the slab are re-dissolved and then finely precipitated during hot rolling and annealing, which may suppress grain growth and deteriorate magnetism. Specifically, the heating of the slab may be a step of heating the slab at a temperature range of 1,100 to 1,200° C. for 0.5 to 1 hour.

Next, a hot-rolled sheet is manufactured by hot rolling the slab. A thickness of the hot-rolled sheet may be 1.6 to 2.5 mm. Specifically, the thickness of the hot-rolled sheet may be 1.6 to 2.3 mm. In the manufacturing of the hot-rolled sheet, a finish rolling temperature may be 790 to 890° C. The hot-rolled sheet may be coiled at a temperature of 580 to 680° C.

After the manufacturing of the hot-rolled sheet, annealing the hot-rolled sheet may be further included. In this case, a hot-rolled sheet annealing temperature may be 900 to 1,195° C., and an annealing time may be 40 to 100 seconds. When the hot-rolled sheet annealing temperature is too low, a structure is not grown or grows finely, and thus, it is not easy to obtain a texture favorable for magnetism during annealing after cold rolling. When the hot-rolled sheet annealing temperature is too high, recrystallized grains may be excessively grown, and surface defects of the sheet may be excessive. The hot-rolled sheet annealing is performed to increase an orientation favorable for magnetism, if necessary, and may be omitted. The annealed hot-rolled sheet may be pickled.

Next, a cold-rolled sheet is manufactured by cold rolling the hot-rolled sheet. A thickness of the cold-rolled sheet may be 0.27 to 0.35 mm. Specifically, the thickness of the cold-rolled sheet may be 0.27 to 0.30 mm. When the thickness of the cold-rolled sheet is large, the iron loss may be deteriorated. The cold rolling may be a step of performing cold rolling once. A final reduction ratio may be in a range of 72 to 88%.

Next, the cold-rolled sheet is subjected to final annealing. An annealing temperature in the subjecting of the cold-rolled sheet to the final annealing is not particularly limited as long as it is a temperature that is generally applied to a non-oriented electrical steel sheet. Since the iron loss of the non-oriented electrical steel sheet is closely related to a grain size, the cold-rolled sheet may be subjected to final annealing at 850 to 1,080° C. for 60 to 150 seconds. When the temperature is too low, grains are too fine, which causes an increase in hysteresis loss, and when the temperature is too high, grains are too coarse, which causes an increase in eddy loss, resulting in deterioration of iron loss. Specifically, the subjecting of the cold-rolled sheet to the final annealing may be performed at 1,040 to 1,060° C. for 60 to 120 seconds.

The method for manufacturing a non-oriented electrical steel sheet may further include coating an insulating coating film on the final annealed cold-rolled sheet. The insulating coating film may be treated with organic, inorganic, and organic/inorganic composite coating films, and may be treated with other insulating coating agents.

Hereinafter, Examples of the present invention will be described in detail so that those skilled in the art to which the present invention pertains may easily practice the present invention. However, the present invention may be implemented in various different forms and is not limited to Examples described herein.

Example 1

Slabs having the compositions as shown in Table 1 were heated to 1,150° C. Thereafter, the slab was hot rolled to a thickness of 1.8 mm, 2.3 mm, or 2.5 mm, and coiling was performed at 650° C. A hot-rolled steel sheet cooled in the air was subjected to hot-rolled sheet annealing at 900 to 1,100° C. for 40 to 80 seconds.

TABLE 1

| Steel type | Si | Mn | Al | P | C | S | N | Ti | Se | Ge |
|---|---|---|---|---|---|---|---|---|---|---|
| A | 3.18 | 0.305 | 0.225 | 10.008 | 0.0015 | 0.0012 | 0.0010 | 0.0023 | 0.0017 | 0.0002 |
| B | 3.04 | 0.205 | 0.422 | 0.037 | 0.0021 | 0.0018 | 0.0016 | 0.0007 | 0.0009 | 0.0041 |
| C | 2.98 | 0.049 | 0.237 | 0.045 | 0.002 | 0.0014 | 0.0016 | 0.0012 | 0.0017 | 0.0008 |
| D | 3.07 | 0.138 | 0.117 | 0.023 | 0.001 | 0.0050 | 0.0007 | 0.0015 | 0.0011 | 0.0005 |
| E | 2.81 | 0.314 | 0.078 | 0.067 | 0.0026 | 0.0023 | 0.0017 | 0.001 | 0.0013 | 0.0021 |
| F | 3.21 | 0.145 | 0.107 | 0.009 | 0.0021 | 0.0014 | 0.0015 | 0.0008 | 0.0002 | 0.0011 |
| G | 3.15 | 0.172 | 0.214 | 10.008 | 0.0015 | 0.0011 | 0.0013 | 0.0012 | 0.0019 | 0.0001 |

The annealed hot-rolled sheet was pickled, and then the pickled hot-rolled sheet was cold rolled to a thickness of 0.27 mm, 0.30 mm, or 0.35 mm. Thereafter, the cold-rolled sheet was subjected to final annealing at 980 to 1,060° C. for 50 to 120 seconds, thereby manufacturing a final annealed sheet.

The iron loss $W_{15/50}$, the magnetic flux density B50, the texture phase characteristics of the manufactured final annealed sheets are shown in Table 2.

Each measurement method was as follows.

An Epstein specimen having a length of 305 mm and a width of 30 mm for magnetism measurement was formed from the manufactured final annealed sheet in an L direction (rolling direction) and a C direction (direction perpendicular to the rolling direction).

In addition, in order to measure the texture, a 5 mm×5 mm area was observed using electron backscatter diffraction (EBSD).

The tensile test was performed by measurement according to the JIS 13-A standard, and at this time, the test was performed while applying a force of 30 MPa/s to the tensile specimen up to an elongation of 0.2% and applying a strain of 0.007/s at an elongation of 0.2% or more.

In Table 2, $I_{\{111\}<112>}$ represents the intensity of {111}<112> on the ODF image compared to the random orientation of the EBSD test performed on the ½ to ⅓ region of the thickness of the steel sheet.

TABLE 2

| Specimen | Hot-rolled sheet annealing temperature (° C.) | Cold-rolled sheet thickness (mm) | Final annealing temperature (° C.) | Iron loss W15/50 (W/kg) | $I_{(111)<112>}$ | Grain diameter (μm) | Yield strength (MPa) | Tensile strength (MPa) | (Tensile strength Yield strength)/ Grain diameter |
|---|---|---|---|---|---|---|---|---|---|
| A1 | 1020 | 0.27 | 1020 | 2.04 | 2.7 | 92 | 398 | 536 | 1.50 |
| A2 | 1020 | 0.3 | 1040 | 2.13 | 2.5 | 105 | 395 | 537 | 1.35 |
| A3 | 1020 | 0.35 | 1040 | 2.31 | 2.6 | 104 | 395 | 544 | 1.43 |
| B1 | 1040 | 0.3 | 1040 | 2.16 | 2.8 | 107 | 378 | 532 | 1.44 |
| B2 | 1040 | 0.35 | 1040 | 2.41 | 3.1 | 102 | 391 | 534 | 1.40 |
| B3 | 1080 | 0.35 | 1000 | 2.32 | 2.6 | 104 | 390 | 536 | 1.40 |
| C1 | 1080 | 0.3 | 980 | 2.05 | 2.4 | 82 | 388 | 502 | 1.39 |
| C2 | 1080 | 0.3 | 1000 | 2.08 | 2.3 | 88 | 384 | 503 | 1.35 |
| C3 | 1080 | 0.3 | 1020 | 1.96 | 2.1 | 91 | 378 | 501 | 1.35 |
| C4 | 1080 | 0.3 | 1040 | 1.95 | 2 | 102 | 375 | 499 | 1.22 |
| C5 | 1080 | 0.3 | 1060 | 1.91 | 2 | 112 | 374 | 499 | 1.12 |
| D1 | 1020 | 0.27 | 1060 | 1.92 | 1.8 | 115 | 362 | 495 | 1.16 |
| D2 | 1080 | 0.27 | 1060 | 1.84 | 1.8 | 124 | 354 | 496 | 1.15 |
| D3 | 1020 | 0.35 | 1060 | 2.13 | 2.1 | 122 | 360 | 501 | 1.16 |
| D4 | 1060 | 0.35 | 1040 | 2.11 | 2 | 115 | 362 | 498 | 1.18 |
| D5 | 1060 | 0.35 | 1060 | 2.07 | 1.9 | 127 | 358 | 499 | 1.11 |
| E1 | 1080 | 0.27 | 1040 | 1.85 | 1.8 | 107 | 376 | 503 | 1.19 |
| E2 | 1080 | 0.27 | 1060 | 1.83 | 1.9 | 118 | 370 | 500 | 1.10 |
| E3 | 1080 | 0.3 | 1060 | 1.89 | 2 | 115 | 352 | 499 | 1.28 |
| E4 | 1080 | 0.3 | 1040 | 1.92 | 2.1 | 109 | 367 | 501 | 1.23 |
| E5 | 1080 | 0.35 | 1040 | 1.97 | 2 | 118 | 378 | 511 | 1.13 |
| F1 | 1020 | \|0.35 | 1020 | 2.13 | 2.3 | 92 | 388 | 510 | 1.33 |
| F2 | 1040 | 0.35 | 1020 | 2.13 | 2.2 | 95 | 383 | 508 | 1.32 |
| F3 | 1060 | 0.35 | 1020 | 2.11 | 2.1 | 98 | 379 | 508 | 1.32 |
| F4 | 1080 | 0.35 | 1020 | 2.09 | 2.1 | 102 | 375 | 504 | 1.26 |
| F5 | 1080 | 0.35 | 1040 | 2.03 | 1.9 | 108 | 367 | 499 | 1.22 |
| G1 | 1060 | 0.27 | 1000 | 1.98 | 2.1 | 97 | 378 | 503 | 1.29 |
| G2 | 1060 | 0.27 | 1020 | 1.92 | 2.1 | 102 | 376 | 497 | 1.19 |
| G3 | 1060 | 0.3 | 1000 | 2.03 | 2 | 100 | 376 | 495 | 1.19 |
| G4 | 1060 | 0.35 | 1000 | 2.15 | 2 | 103 | 372 | 493 | 1.17 |
| G5 | 1080 | 0.35 | 1000 | 2.13 | 1.9 | 107 | 368 | 492 | 1.16 |

The present invention is not limited to the exemplary embodiments, but may be manufactured in various different forms, and it will be apparent to those skilled in the art to which the present invention pertains that various modifications and alterations may be made without departing from the spirit or essential feature of the present invention. Therefore, it is to be understood that the exemplary embodiments described hereinabove are illustrative rather than restrictive in all aspects.

The invention claimed is:

1. A non-oriented electrical steel sheet comprising, by wt %: 2.10 to 3.80% of Si, 0.001 to 0.600% of Mn, 0.001 to 0.600% of A1, 0.0005 to 0.0030% of Se, 0.0003 to 0.0010% of Ge, and a balance of Fe and inevitable impurities, wherein a ratio of {tensile strength (MPa)−yield strength (MPa)} to an average grain diameter (μm) of the non-oriented electrical steel sheet is 1.10 to 1.40, wherein when an electron backscatter diffraction (EBSD) test is performed on a ½ to ⅓ region of a thickness of the non-oriented electrical steel sheet, a strength of a {111} plane facing a <112> direction based on a rolling direction on an orientation distribution function (ODF) image is 2.5 or less compared to a random orientation, and wherein an average grain diameter of the non-oriented electrical steel sheet is 80 to 130 μm.

2. The non-oriented electrical steel sheet of claim 1, further comprising, by wt %, 0.001 to 0.100% of P, 0.0005 to 0.0100% of C, 0.001 to 0.010% of S, 0.0001 to 0.010% of N, 0.0005 to 0.0050% of Ti, 0.001 to 0.080% of Sn, and 0.001 to 0.080% of Sb.

3. The non-oriented electrical steel sheet of claim 1, further comprising 0.07 wt % or less of one or more of Cu, Ni, and Cr, respectively.

4. The non-oriented electrical steel sheet of claim 1, further comprising 0.01 wt % or less of one or more of Zr, Mo, and V, respectively.

5. The non-oriented electrical steel sheet of claim 1, wherein:

a yield strength of the non-oriented electrical steel sheet is 350 to 400 MPa.

6. The non-oriented electrical steel sheet of claim 1, wherein:

a tensile strength of the non-oriented electrical steel sheet is 490 to 550 MPa.

7. The non-oriented electrical steel sheet of claim 1, wherein:

an iron loss ($W_{15/50}$) of the non-oriented electrical steel sheet is 2.20 W/kg or less.

8. The non-oriented electrical steel sheet of claim 1, comprising 2.50 to 3.20 wt % of Si.

9. The non-oriented electrical steel sheet of claim 1, comprising 0.050 to 0.350 wt % of Mn.

10. The non-oriented electrical steel sheet of claim 1, comprising 0.070 to 0.450 wt % of Al.

11. The non-oriented electrical steel sheet of claim 1, comprising 0.0005 to 0.0020 wt % of Se.

12. The non-oriented electrical steel sheet of claim 1, further comprising 0.001 to 0.080 wt % of P.

* * * * *